Sept. 13, 1949. G. C. SCHAUB 2,481,690
MOLDING AND PRINTING METHOD
Original Filed May 25, 1944 7 Sheets-Sheet 1

INVENTOR.
GORDON C. SCHAUB
BY
*Jm Nolan*
ATTORNEY

Sept. 13, 1949.　　　　G. C. SCHAUB　　　　2,481,690
MOLDING AND PRINTING METHOD
Original Filed May 25, 1944　　　　　　　　　　7 Sheets-Sheet 2
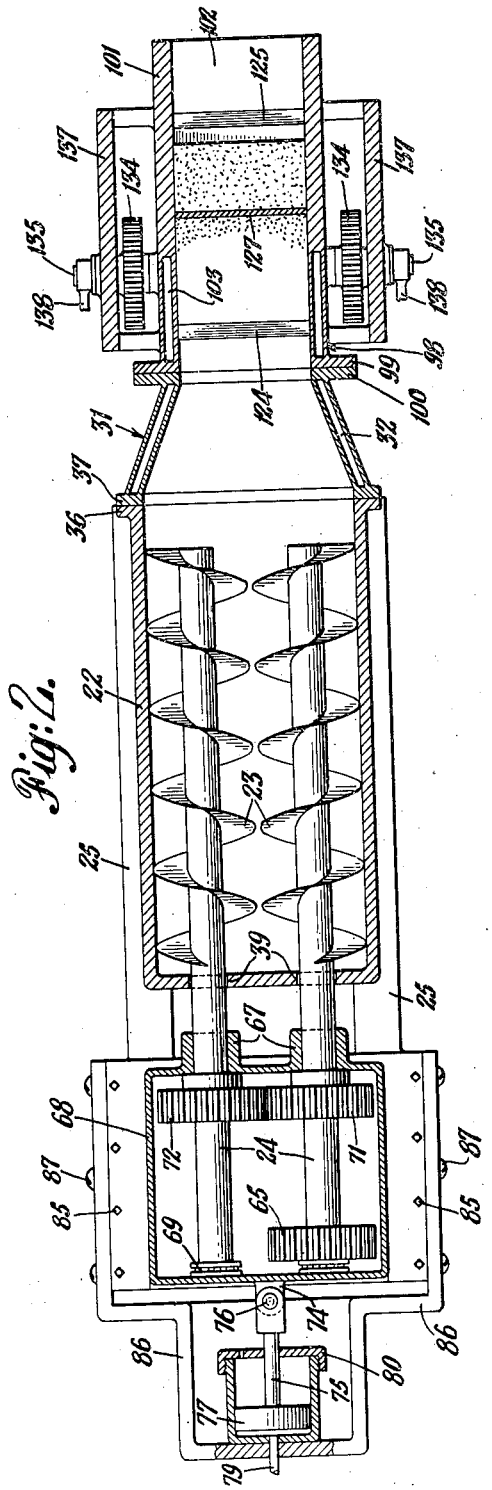
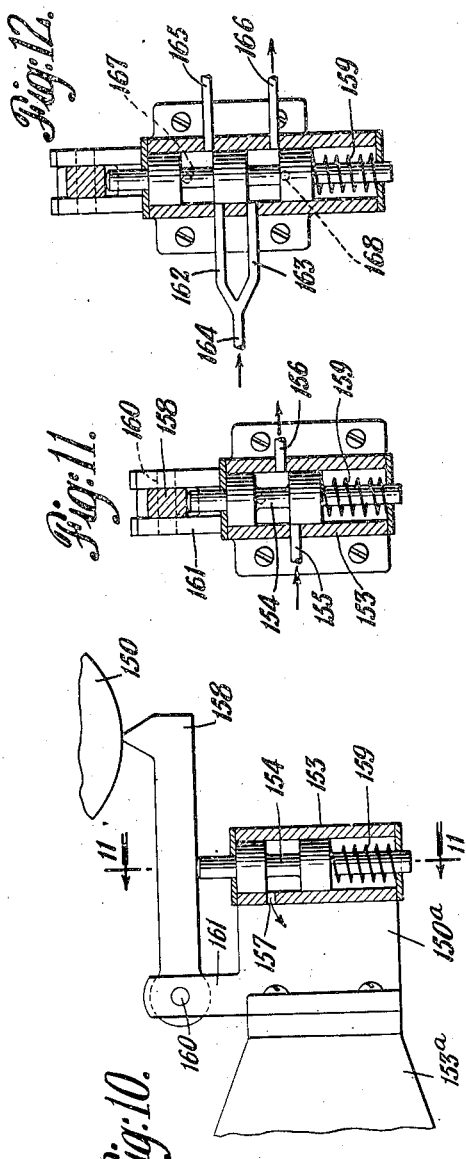
INVENTOR.
GORDON C. SCHAUB
BY
ATTORNEY Sept. 13, 1949.　　　　G. C. SCHAUB　　　　2,481,690
MOLDING AND PRINTING METHOD Original Filed May 25, 1944　　　　7 Sheets-Sheet 3

INVENTOR.
GORDON C. SCHAUB
BY
ATTORNEY

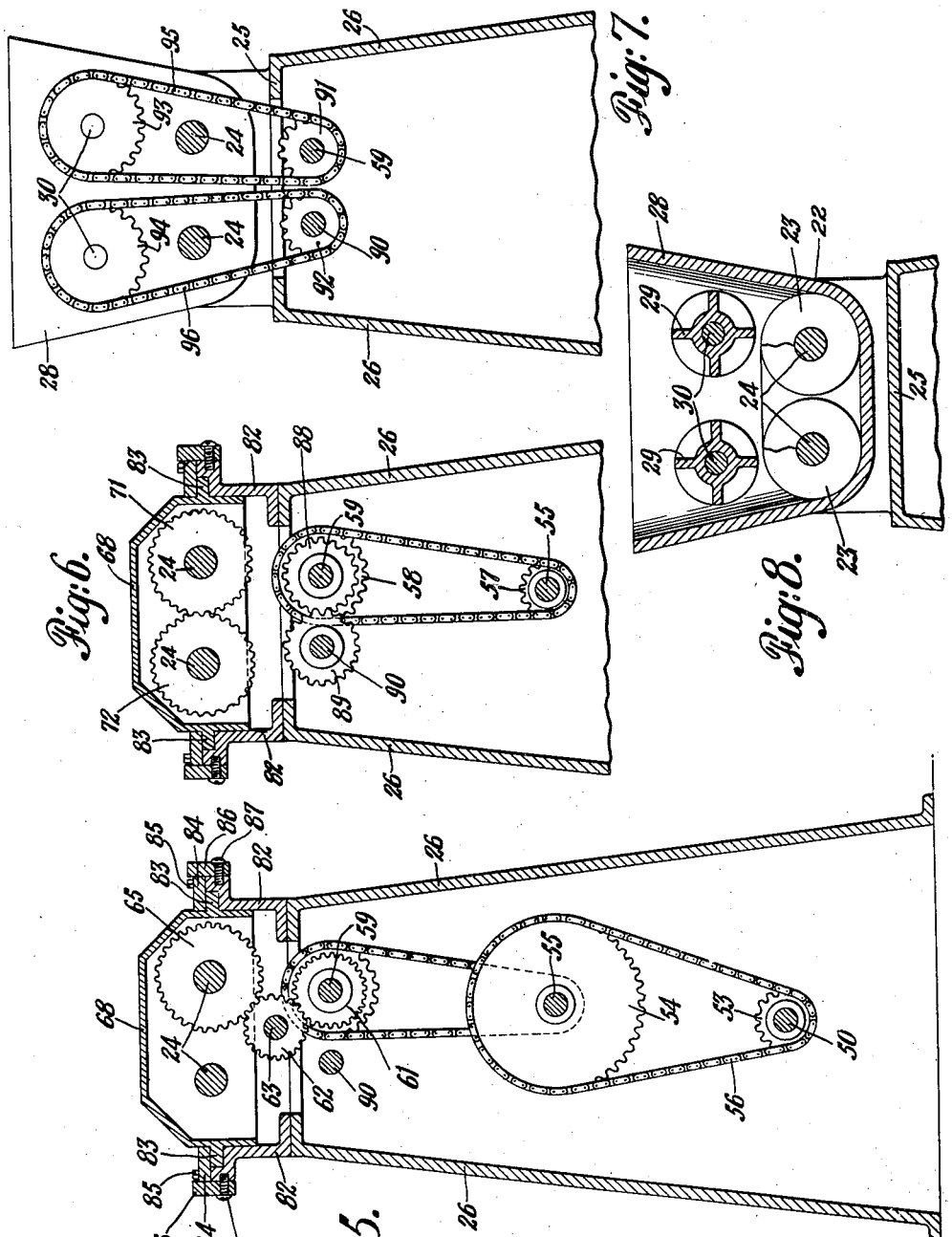

Sept. 13, 1949.　　　　G. C. SCHAUB　　　　2,481,690
MOLDING AND PRINTING METHOD
Original Filed May 25, 1944　　　　7 Sheets-Sheet 5
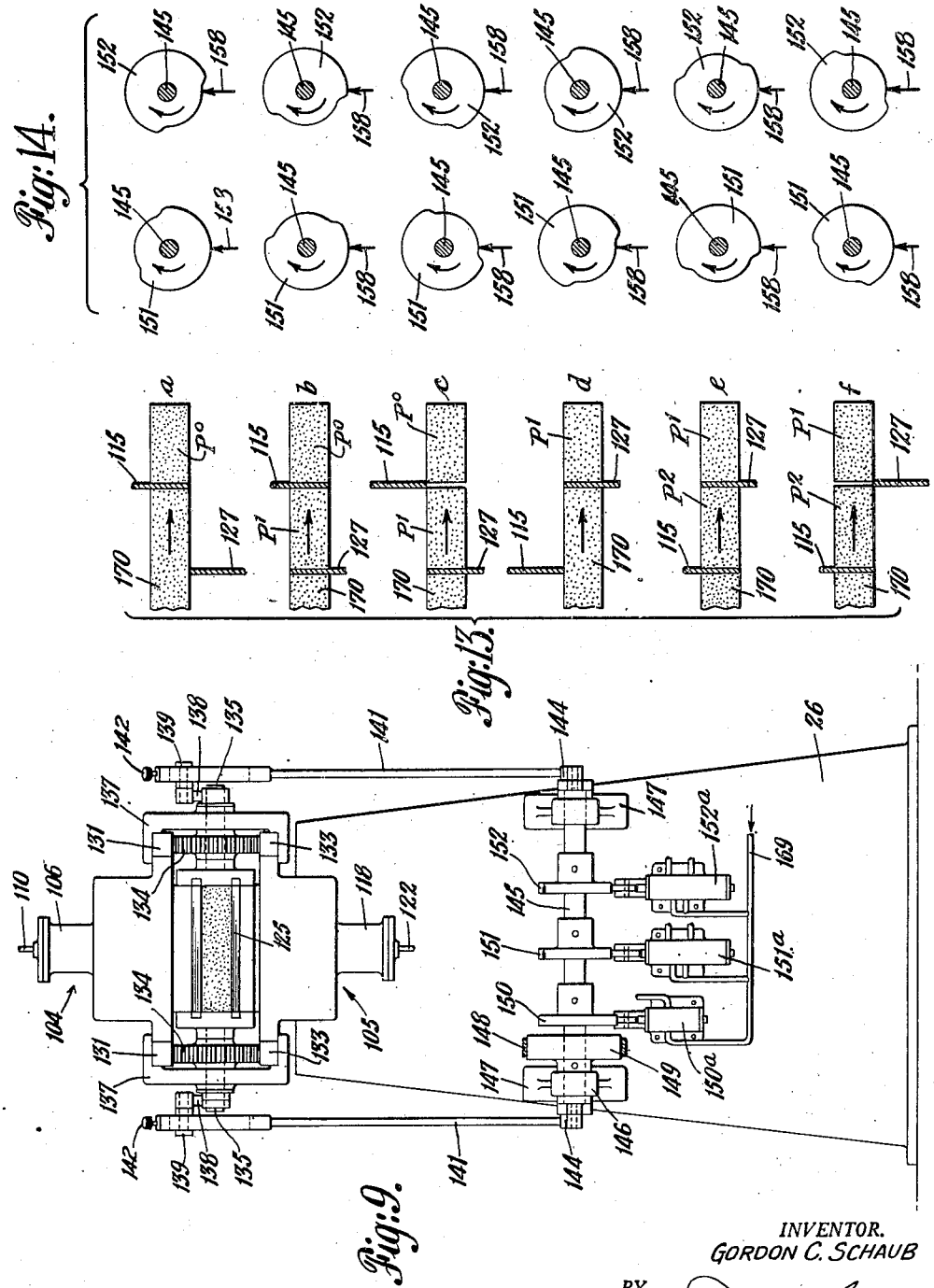
INVENTOR.
GORDON C. SCHAUB
BY
ATTORNEY Sept. 13, 1949.　　　　　G. C. SCHAUB　　　　　2,481,690
MOLDING AND PRINTING METHOD
Original Filed May 25, 1944　　　　　　　　　　7 Sheets-Sheet 6
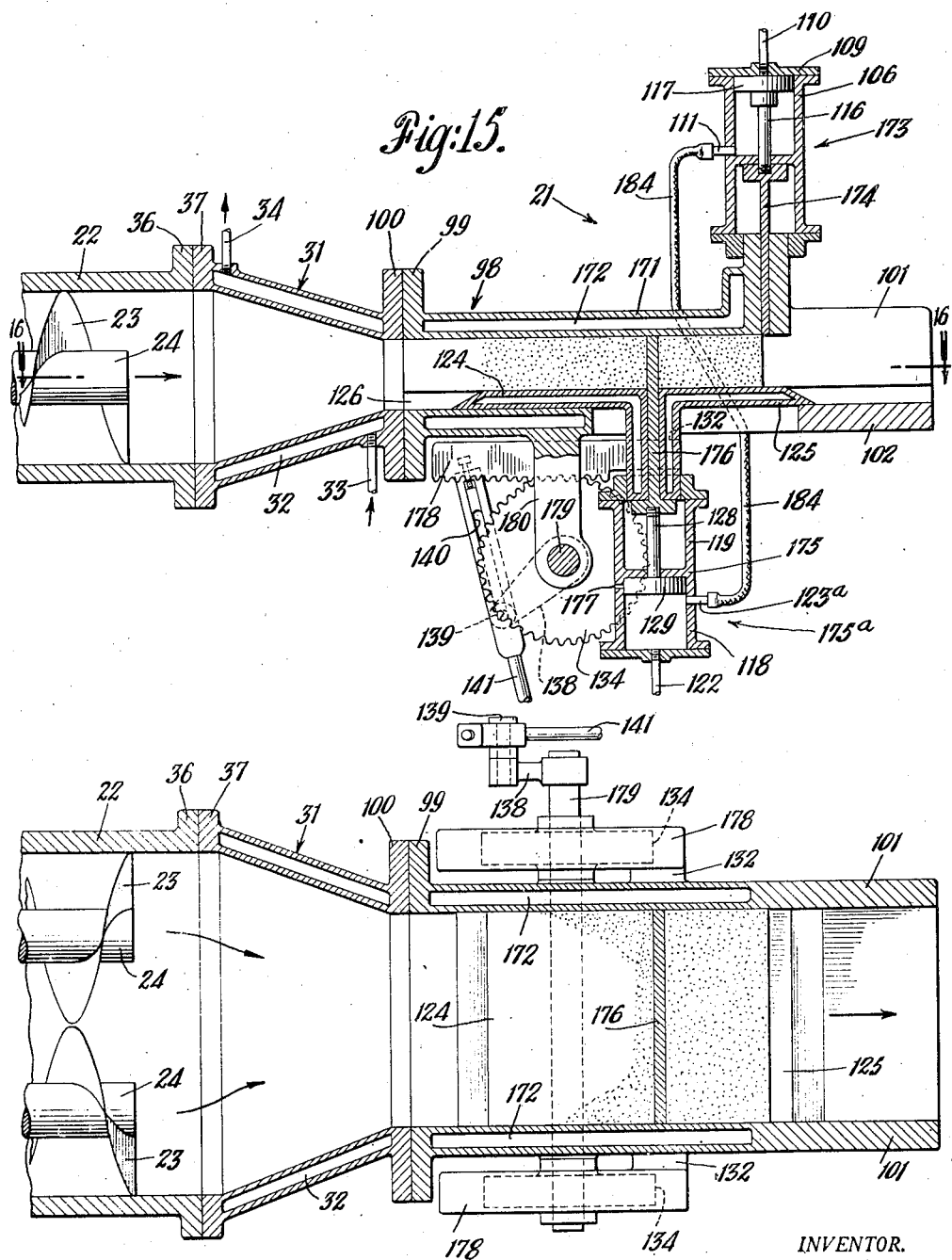
INVENTOR.
GORDON C. SCHAUB
BY
ATTORNEY Sept. 13, 1949.  G. C. SCHAUB  2,481,690
MOLDING AND PRINTING METHOD
Original Filed May 25, 1944  7 Sheets-Sheet 7
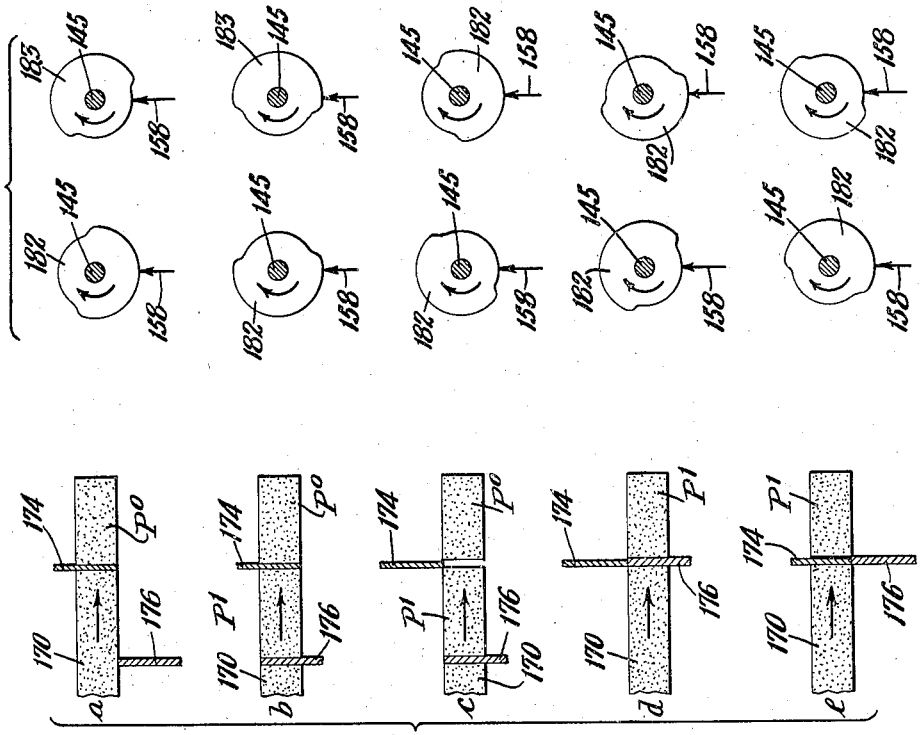
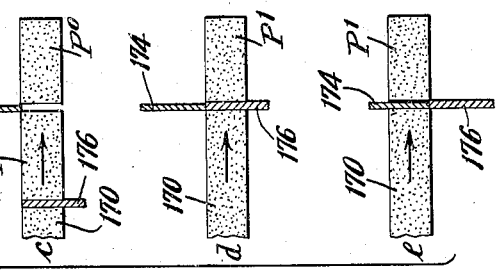
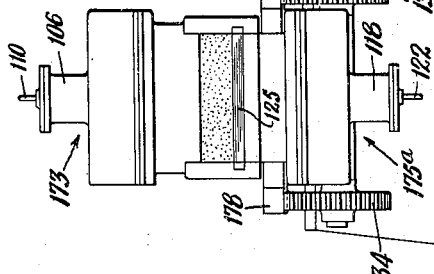
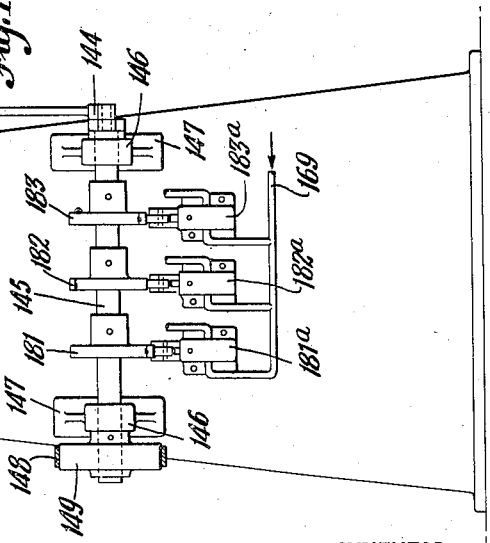
INVENTOR.
GORDON C. SCHAUB
BY
ATTORNEY Patented Sept. 13, 1949

2,481,690

UNITED STATES PATENT OFFICE 2,481,690

MOLDING AND PRINTING METHOD

Gordon C. Schaub, Westfield, N. J., assignor to The Best Foods, Inc., New York, N. Y., a corporation of New Jersey Original application May 25, 1944, Serial No. 537,351. Divided and this application February 10, 1949, Serial No. 75,575

2 Claims. (Cl. 31—8)

This is a divisional application of the copending application, Serial No. 537,351, filed May 25, 1944.

This invention relates to the production of plastic solid or semisolid materials and particularly to an improved method of and an apparatus for continuously and simultaneously molding and printing plastic solid or semisolid oleaginous comestibles such as margarine, butter, shortening, lard, and the like.

In the production of plastic semisolid to solid oleaginous products such as margarine, the solidified mass of margarine, suitably worked, temperature-conditioned, and blended with the requisite seasoning and other materials, is passed through a molding apparatus, commonly known as a molder, wherein it is formed into a continuous strip, ribbon, or rod having the cross-sectional shape (usually square or rectangular) desired in the finished product. This ribbon of margarine is expelled from the molder into a printing machine, usually termed a printer, which cuts the ribbon into the desired lengths or prints. These prints are then conveyed to a wrapping device or wrapper, which suitably wraps and packages them for distribution and sale.

It is desirable to so construct the molder and the printer that they can be operated continuously and synchronously as a unit assembly. Proposals looking toward the accomplishment of this objective have been made heretofore, but they have not been entirely successful because of various operating difficulties which have arisen. In one instance, for example, such a combined apparatus designed to operate continuously involved the frequent and sudden starting and stopping of the molder with the result, inter alia, that the accompanying vibrations seriously interferred with the smooth performance of the apparatus.

Furthermore, in the operation of the printer, care must be taken that each print has the desired minimum weight for the particular size of product being made. This object is usually attained by so constructing the printer or so adjusting the margarine cutting means that each print weighs slightly more than the minimum desired amount. The result of such operation obviously represents a loss, which may average between 2 and 4% of the product sold and may range even higher. Any provision, accordingly, whereby this loss can be materially reduced will effect a substantial saving in the cost of producing margarine and similar oleaginous materials. It will be appreciated, of course, that this operating difficulty arises from the fact that a volume measure instead of a weight measure is utilized in cutting the ribbon of margarine into the individual prints.

One object of my invention, accordingly, is to provide an improved method of and an apparatus for continuously and synchronously molding and printing margarine and the like.

Another object of my invention is to provide an improved combination margarine molding and printing device which can be operated continuously and synchronously with a greater degree of accuracy in printing than heretofore possible and which can be built at a smaller cost than similar machines heretofore available.

A further object of my invention is to provide an improved method of and an apparatus for continuously molding a mass of margarine into a ribbon ready for printing.

Still another object of my invention is the provision of an improved molder which can be operated continuously even though the margarine or the like that it forms into the particular desired shape is only intermittently removed therefrom. It is also an object of my invention to provide an improved method of and an apparatus for more accurately printing margarine and the like.

Another object of my invention is the provision of an improved printer for continuously printing margarine and the like at a high rate of speed and with a minimum of difference between the actual weight and the desired weight of each print.

A still further object of my invention is to provide a method of and an apparatus for molding, printing, and wrapping margarine and the like wherein the product is not touched or handled by the operators.

Further objects and advantages of my invention will appear from the following description of preferred forms of embodiment thereof taken in connection with the accompanying drawings, in which:

Fig. 2 is a horizontal sectional view taken substantially along the line 2—2 of Fig. 1.

Figure 1:
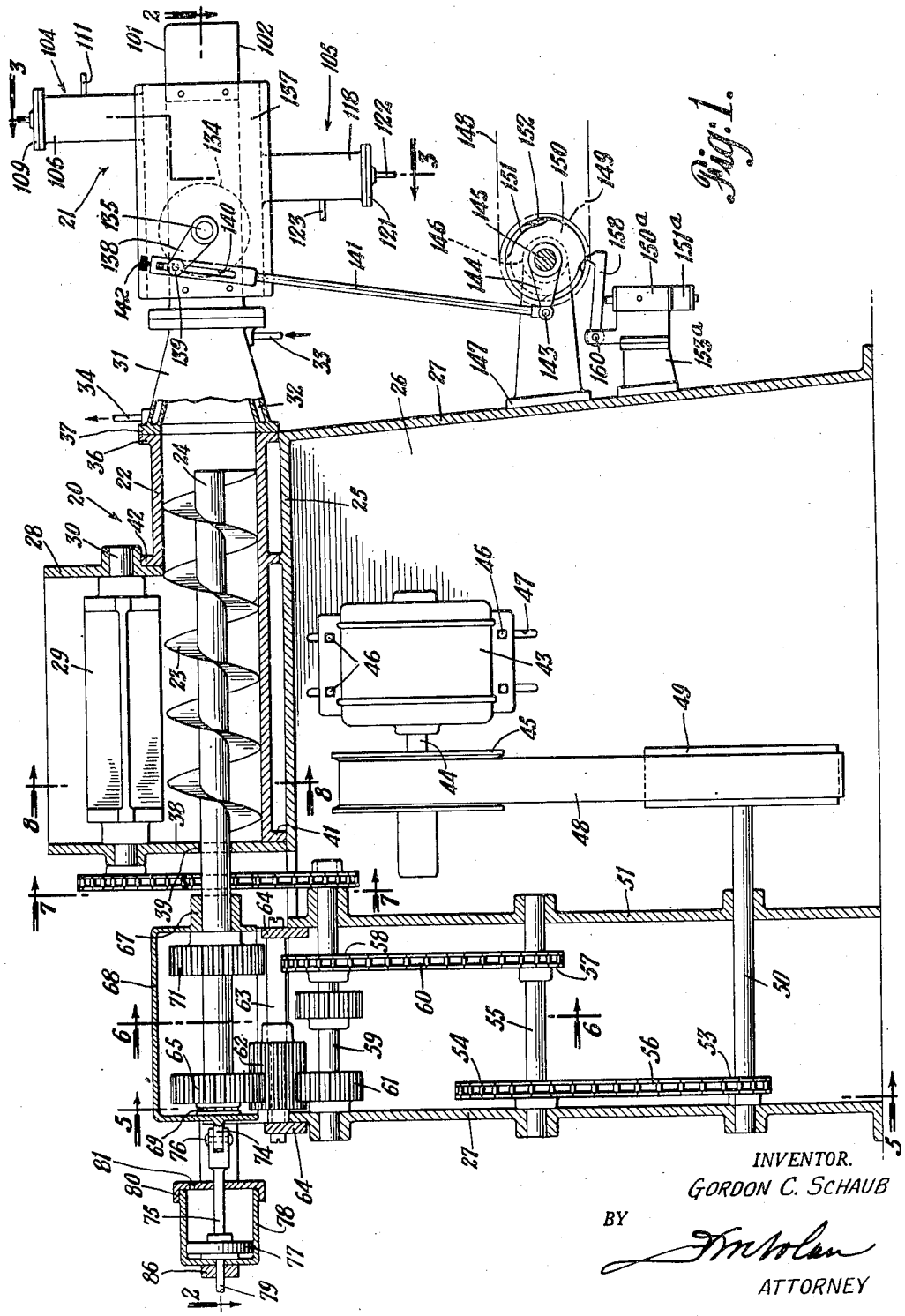
Fig. 1 is an elevation with parts in section of one form of embodiment of my improved combination molder and printer.

Figs. 5, 6, 7, and 8 are vertical sectional views taken substantially along the lines 5—5, 6—6, 7—7, and 8—8, respectively, of Fig. 1.

Fig. 9 is an end view of the printer shown in Fig. 1.

Fig. 10 is a detail elevation with parts in section of the single-acting compressed air valve used with the apparatus shown in Fig. 1.

Fig. 11 is a vertical sectional view taken substantially along the line 11—11 of Fig. 10.

Fig. 12 is a vertical sectional view, similar to that of Fig. 11, through the double-acting compressed air valve used with the apparatus shown in Fig. 1.

Fig. 13 illustrates the relative positions of the cutting blades with respect to the strip of margarine as the latter is extruded from the molder and cut into prints by the printer.

Fig. 14 shows the respective positions of the cams operating the compressed air valves controlling the movement of the cutting blades, such positions corresponding to the relative positions of the cutting blades shown in Fig. 13.

Fig. 15 is an elevation with parts in section of a modified form of my improved printer.

Fig. 16 is a horizontal sectional view taken substantially along the line 16—16 of Fig. 15.

Fig. 17 is an end view of the modified form of my improved printer shown in Fig. 15.

Figs. 18 and 19 respectively illustrate the relative positions of the cutting blades with respect to the strip of margarine and of the cams in the operation of my modified printer shown in Fig. 15.

In accordance with my invention, there is provided a combination system for continuously and simultaneously molding and printing a plastic semisolid to solid oleaginous material such as margarine and the like. This system includes a molder and a printer which are designed to continuously operate as a synchronized single unit that forms the margarine introduced into the molder into a continuous ribbon which is expelled or extruded directly into the printer for the production of the individual prints of margarine. The cutting operation of the printer, although intermittent, is substantially continuous; and the molder is designed to operate continuously despite the intermittent interruptions in the continued movement of the ribbon of margarine as it is expelled from the molder into the printer. Preferably, the operation of the combined molder and printer is synchronized with that of the wrapper into which the prints of margarine are discharged so that the molding, printing, and packaging steps are carried on smoothly and continuously.

Although my invention is applicable to the processing of various types of plastic semisolid to solid oleaginous materials as already pointed out, for convenience only it will be described in its application to the manufacture of margarine. It will be understood, however, that the use of my invention is not necessarily so limited.

My improved apparatus consists of a molder, generally indicated at 20, and a printer, generally indicated at 21 (see Figs. 1 and 2), which are adapted and designed to continuously operate as a single unit in combination and in synchronism with each other. The molder 20 comprises a housing 22 containing a pair of screw conveyors 23 carried on shafts 24. This housing, which may consist of two intersecting cylindrically shaped surfaces and which is desirably designed to closely fit the screw conveyors, is carried on a platform 25 having side supporting plate members 26 and end supporting plate members 27. In its top surface, housing 22 is provided with a hopper 28, through which the tempered mass of solidified margarine emulsion is introduced into the molder. A pair of multibladed longitudinal paddles 29 carried on shafts 30 journaled in bearings formed in opposite walls of hopper 28 serve to force and fold the margarine into the path of screw conveyors 23 so that a continuous feed thereof is maintained. As shown in Fig. 1, one end of each of these shafts 30 preferably extends beyond the hopper wall in which it is journaled. Although I have shown a pair of screw conveyors 23 and a pair of folding-in paddles 29, which arrangement I have found to be most satisfactory, I may use one or more than two of both the screw conveyors and the paddles if it is desirable to do so.

Figure 4:
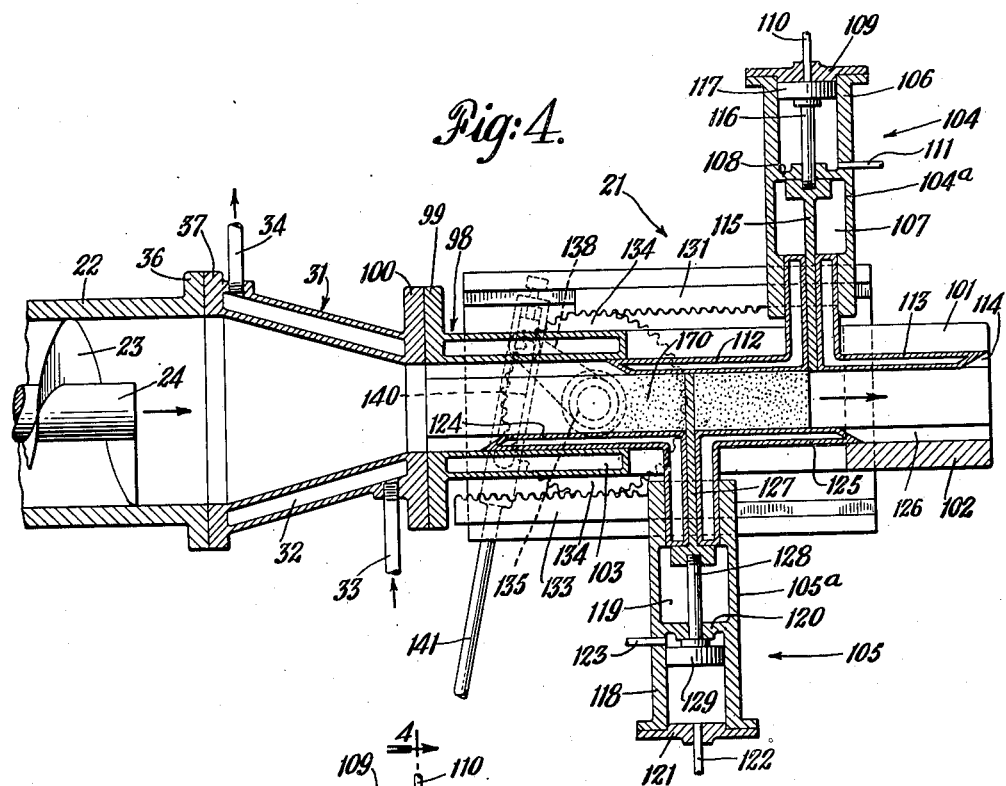
Fig. 4 is a detail vertical sectional view taken substantially along the line 4—4 of Fig. 3.

One end of housing 22 is open for the passage therethrough of the margarine under the pressure of the screw conveyors into the extrusion nozzle or template 31, the outlet of which forms the margarine into a continuous ribbon having a predetermined cross section, usually rectangular, as indicated in Figs. 2 and 4. This extrusion nozzle is desirably provided with a jacket 32, through which a liquid tempering medium is circulated as by inlet 33 and outlet 34. Preferably, the reduction in cross section effected by this nozzle is rather gradual so that plugging of the nozzle and other operating interruptions can be avoided.

Housing 22 and nozzle 31 may be provided with flanges 36 and 37, respectively, whereby they may be fastened together by any suitable means (not shown). The other end of housing 22 is closed by plate 38, which may conveniently be an extension of one wall of hopper 28. This plate is provided with openings 39, through which shafts 24 pass. Housing 22 may also be provided with flanges 41 and 42 whereby hopper 28 may be fastened thereto in any appropriate manner (not shown). Flanges 41, 42, and 36 also serve to space housing 22 from platform 25 as shown in Fig. 1.

The driving power for the screw conveyors is furnished by a motor 43, the shaft 44 of which carries pulley 45. This motor may be conveniently mounted on one of the supporting plates 26 as by bolts 46, which pass through the elongated slots 47 in plate 26. Belt 48 passes over pulley 45 on shaft 44 and over pulley 49 on shaft 50, which is journaled in bearings in supporting plate 27 and in the partition plate 51 parallel thereto. Pulley 45 is preferably a "vari-pulley" so that the speed of rotation of the screw conveyors 23 may be readily and quickly adjusted when necessary. In the form of embodiment shown (see Fig. 5), shaft 50 carries a sprocket 53, which drives sprocket 54 on shaft 55 by means of sprocket chain 56. Similarly, sprocket 57 on shaft 55 drives sprocket 58 on shaft 59 by means of sprocket chain 60. Shafts 55 and 59 are also journaled in bearings provided in plates 27 and 51. It will be apparent that, although one speed reduction system has been shown, any other suitable system may be used in place thereof.

Pinion 61 on shaft 59 drives a second pinion 62, which idles loosely on shaft 63 fastened in the trunnions 64 attached to plate members 27 and 51, respectively; and pinion 62 in turn drives a third pinion 65 carried by one of the shafts 24, the extensions of which are journaled in bearings 67 in gear casing or carriage 68 and the ends of which are carried in thrust bearings 69 in the opposite wall of such casing. It will be noted that shafts 24 of screw conveyors 23 are supported entirely by the bearings in casing 68. The shaft 24 carrying pinion 65 also carries pinion 71, which meshes with pinion 72 on the other shaft 24 so that the two screw conveyors 23 rotate in opposite directions. Alternatively, provision may be made to drive these screw conveyors in the same direction if it is desirable to do so.

The wall of gear casing 68, in which the thrust bearings 69 are located, is provided with a lug or tongue extension 74, to which the bifurcated end of a piston rod 75 is attached as by pin 76 (see Fig. 2). This connection is desirably made a little loose to insure flexibility of movement. Piston rod 75 is attached to piston 77, which slides in the pneumatic cylinder 78 under the influence of compresed air introduced thereinto through line 79. Cylinder cap 80 is desirably provided with the vent 81.

Slide rails 82 (see Fig. 5) permit the gear casing 68 to slide back and forth in accordance with the movement of piston 77. These rails are attached in any appropriate manner as by welding to platform 25. For this purpose the longitudinal walls of casing 68 are provided with flanges 83, which rest on and move in corresponding shoulders in the respective slide rails 82. Members 84, which are preferably removably fastened to slide rails 82 as by bolts 85, serve to hold casing 68 in its sliding position. The pneumatic cylinder 78 may be conveniently supported by the U-brace 86 attached to the slide rails 82 as by bolts 87. As shown in Fig. 1, pinion 62 is necessarily made wider than the other pinions since it must continue to drive pinion 65 in any position that casing 68 assumes as well as during the sliding movement of casing 68.

Paddles 29 may also be driven from the same source of power (see Figs. 6 and 7). To accomplish this purpose, shaft 59 carries another pinion 88, which meshes with a second pinion 89 carried on a shaft 90 also journaled in bearings provided in the plate members 27 and 51. Shafts 59 and 90 also carry sprockets 91 and 92, which respectively drive sprockets 93 and 94 on shafts 30 by means of sprocket chains 95 and 96. Again, although the two paddles 29 are thus rotated in opposite directions, provision may alternatively be made to drive them in the same direction if it is desirable to do so.

Figure 3:
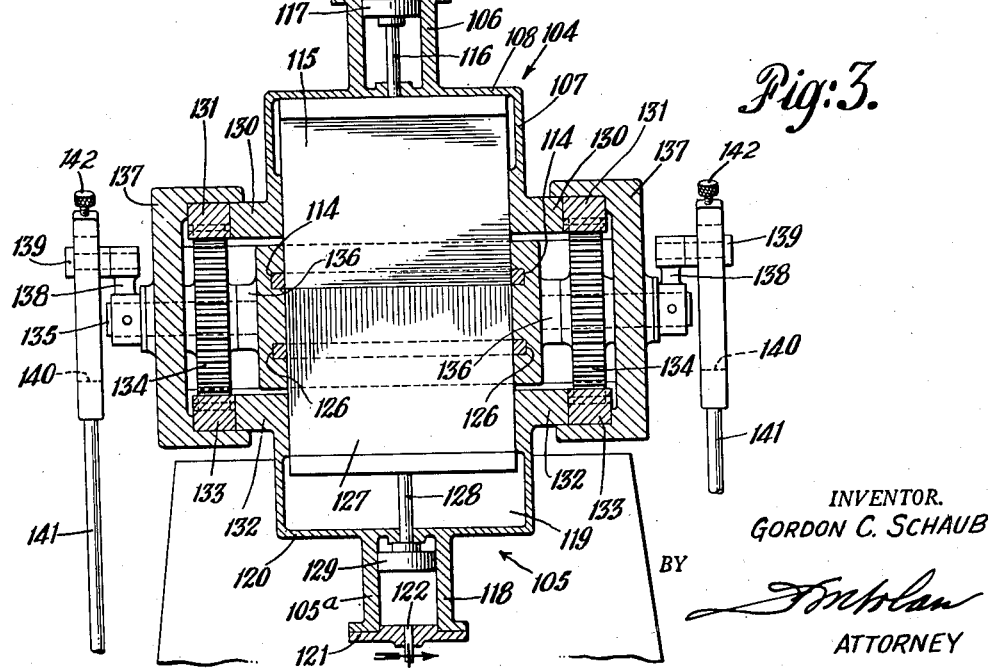
Fig. 3 is a vertical sectional view taken substantially along the line 3—3 of Fig. 1.

The printer 21 (see Figs. 3 and 4) includes a tube 98, desirably rectangular in cross section as shown, which may be provided with a flange 99 for attachment in any convenient manner (not shown) to the flange 100 on extrusion nozzle 31. The side walls of tube 98 are extended outwardly as at 101, and at their outer end these extended side walls are joined along their lower edges by a platform or support 102. Means (not shown) are desirably provided for the circulation of a liquid tempering medium through jacket 103 surrounding tube 98. The extended side walls 101 may also be so jacketed, but it has not been found necessary to do so.

A pair of reciprocating carriages, the upper one indicated generally at 104 and the lower one at 105, are positioned in the outlet end of tube 98 and between the extended side walls 101 and are adapted for intermittent reciprocating movement therein. Each of these reciprocating carriages is identical in construction but will be described separately for convenience. The upper carriage includes a housing 104a consisting of a pneumatic cylinder 106 and a chamber 107 separated from each other by partition 108. Cover plate 109 is provided with the compressed air inlet 110. A second compressed air inlet 111 is provided in the side wall of the cylinder near the bottom thereof. Two similar but oppositely disposed, right-angled substantially flat sliding members 112 and 113 are attached to the bottom of this cylinder housing as by insertion thereinto. These sliding members are preferably made hollow; and provision (not shown) is made for the circulation of a suitable liquid tempering medium through each member, which is provided with the necessary internal baffling (not shown) to insure proper circulation. The longitudinal edges of members 112 and 113 are adapted to slide in grooves 114 in the respective side walls of tube 98 and the extensions thereof.

Members 112 and 113 are so positioned that a narrow transverse space is provided between their upstanding portions, in which space a cutting member 115, which may be variously termed a gate, blade, or knife, is adapted to slide. This gate is attached to piston rod 116, which is in turn connected to piston 117 in cylinder 106. Chamber 107 accommodates the gate when it is in the raised or noncutting (disengaged) position. The cutting edge of this gate may be made dull as shown since the margarine is sufficiently plastic that it may readily be cut without the use of a knife edge. A suitable stuffing gland is, of course, provided for the opening in partition 108, through which rod 116 passes, to prevent the leakage of air therethrough. Cylinder 106 and chamber 107 may be made integral as shown or in two pieces if desired; and the sliding members may also be made integral with the cylinder housing.

The lower carriage likewise includes a housing 105a consisting of a pneumatic cylinder 118 and a chamber 119 separated from each other by partition 120. Cover plate 121 is provided with a compressed air inlet 122. A second compressed air inlet 123 is provided in the side wall of the cylinder near the top thereof. Two similar but oppositely disposed, right-angled substantially flat sliding members 124 and 125 are attached to the top of this cylinder housing, into which they may be inserted. These members are also preferably made hollow; and provision is made for the circulation of a suitable liquid tempering medium through each member, which is provided with the necessary internal baffling (not shown) to insure proper circulation. The longitudinal edges of members 124 and 125 are likewise adapted to slide in grooves 126 in the respective side walls and extensions of tube 98.

Members 124 and 125 are also so positioned that a narrow transverse space is provided between their upstanding portions, in which space a cutting gate or blade 127 is adapted to slide. This gate is attached to piston rod 128, which is in turn connected to the piston 129 in cylinder 118. Chamber 119 accommodates this gate when it is in the lowered or noncutting (disengaged) position (corresponding to the raised position for gate 115). A suitable stuffing gland is, of course, provided for the opening in the partition 120, through which rod 128 passes. Cylinder 118 and chamber 119 may also be made integral as shown or in two pieces if desired.

Upper housing 104a is provided below chamber 107 with lugs or flanges 130, to each of which is attached a rack 131 that extends along the upper edge of its respective side wall 101. Similarly, lower housing 105a is provided above chamber 119 with lugs or flanges 132, to each of which is attached a rack 133 that extends along the lower edge of its respective side wall 101. A gear 134 is provided on each side of tube 98 to engage racks 131 and 133. Each gear is attached to a stud 135, one end of which is journaled in a bearing 136 fixed in the outer surface of side wall 101. The other end of each stud extends through an opening in channel members 137 and is attached to a crank 138. Channel members 137 fit over the lugs 130 and 132 on housings 104a and 105a, respectively, and provide a guide for the racks 131 and 133 as well as an additional bearing surface for studs 135. The outer end of each crank 138 is provided with a pin 139, which slides in the slotted portion 140 of the connecting rod 141. Alternatively, pin 139 may be directly attached to gear 134. Means such as screw 142 may be provided in the upper end of each connecting rod 141 to vary the length of the slotted portion 140. Each connecting rod is attached at its lower end by means of pin 143 to a second crank 144, which is itself attached to one end of shaft 145. This shaft may be conveniently journaled in bearings 146 supported on bases 147 attached to supporting plate 27. Power to drive shaft 145 may be furnished from any suitable source (not shown) through belt 148 passing over pulley 149.

Shaft 145 (see Fig. 9) carries cams 150, 151, and 152, which respectively operate compressed air valves 150a, 151a, and 152a. Each of these valves is supported on a base 153a, which may also be conveniently attached to supporting plate 27. In this form of embodiment of my invention, valve 150a is desirably single-acting, and valves 151a and 152a are desirably double-acting. Valve 150a (see Figs. 10 and 11) consists of a cylinder 153 and a valve stem 154 extending through the closed ends of the cylinder. This cylinder is provided with a compressed air inlet 155, a compressed air outlet 156, and an exhaust vent 157. Cam follower 158 is kept in contact with the periphery of cam 150 through the constant pressure exerted by coiled spring 159 against valve stem 154, on which the cam follower rests. One end of the cam follower may be pivoted as at 160 in the lug 161 extending from the body of valve 150a. Valves 151a and 152a (see Fig. 12) are similar in construction to valve 150a but are provided with two compressed air inlets 162 and 163, which may be branches of a common supply line 164, two compressed air outlets 165 and 166, and two exhaust vents 167 and 168. The compressed air inlets of the several valves may be conveniently supplied from the manifold line 169.

The outlet 156 from compressed air valve 150a is connected by a flexible tube (not shown) to the inlet 79 on pneumatic cylinder 78, which effects the forward movement of screw conveyors 23. One of the outlets from compressed air valve 151a is connected by suitable flexible tubing (not shown) to inlet 110 on cylinder 106, which operates the gate 115, and the other outlet is similarly connected to inlet 111 on cylinder 106. One of the outlets from compressed air valve 152a is likewise connected by suitable flexible tubing (not shown) to inlet 122 on cylinder 118, which operates the gate 127, and the other outlet is similarly connected to inlet 123 on cylinder 118.

In the operation of this combined molder and printer, the tempered mass of solidified margarine emulsion is fed into hopper 28, wherein it is forced and folded continuously into housing 22. Screw conveyors 23, which are continuously rotated, pick up the margarine and force it under compression into the extrusion nozzle 31, which forms the margarine into a continuous strip or ribbon 170 having the desired rectangular cross section. This continuous strip of margarine is extruded from nozzle 31 into tube 98, wherein it is engaged by the reciprocating carriages 104 and 105, the movable gates of which intermittently cut the strip of margarine into prints and discharge the resulting prints from the printer. Platform 102, which may conveniently be made of wood, supports the margarine prints as they are pushed and displaced from the printer into a wrapping machine (not shown in drawings).

The strip of margarine is cut into the desired prints by the cutting gates or blades 115 and 127, which are operated by means of the pneumatic cylinders 106 and 118, respectively. The relative positions of these cutting gates during the several stages of the cutting cycle are clearly shown in Fig. 13. During this entire cycle one or the other of these gates always blocks the passages defined by tube 98, its extensions, and the reciprocating carriages so that there is a continuous back pressure exerted on the strip of margarine being extruded through nozzle 31 under the influence of screw conveyors 23. A suitable liquid tempering medium such as water at 90–100° F. is desirably circulated through the jacket around nozzle 31 and that around tube 98 and through the hollow portions of the reciprocating carriages to reduce the friction caused by the extrusion and the expulsion of the margarine and to thereby prevent possible plugging of the apparatus.

With reference to Fig. 13, in the stage shown in Fig. 13a, the upper cutting gate 115 has been moved forward a distance equal to the width of print $P^0$, and the lower cutting gate 127 has been moved backward an equal distance. In the stage shown in Fig. 13b, lower gate 127 has been moved into the cutting position to form print $P^1$; and in that shown in Fig. 13c, upper gate 115 has been moved out of the cutting position leaving print $P^0$ to be wrapped and packaged by the wrapper. The movements of the two gates are so synchronized in these two stages that gate 127 moves entirely into the cutting position before movement of gate 115 from such position is begun. The possibility of forming nonuniform or mutilated prints is thus substantially eliminated.

In the stage shown in Fig. 13d, lower gate 127 has been moved forward a distance equal to the width of print $P^1$, which has displaced print $P^0$ towards the wrapper and itself now occupies the space formerly taken up by print $P^0$, and upper gate 115 has been moved backward an equal distance. In the stage shown in Fig. 13e, the upper gate 115 has been moved into the cutting position to form the print $P^2$; and in that shown in Fig. 13f, lower gate 127 has been moved out of the cutting position leaving print $P^1$ to be wrapped and packaged. Again, gate 115 is moved into its cutting position before gate 127 is moved out of its cutting position. The cycle is then repeated, the next stage being that shown in Fig. 13a.

The cutting movements of the two gates are controlled by cams 151 and 152, which respectively pneumatically actuate pistons 117 and 129 in cylinders 106 and 118, which in turn respectively operate the gates 115 and 127. The corresponding relative positions of cams 151 and 152, when the gates 115 and 127 are in the positions indicated in Figs. 13a to 13f, are shown in Figs. 14a to 14f. The backward and forward movement of the reciprocating carriages respectively carrying cutting gates 115 and 127 successively into their cutting and disengaging positions is effected by the alternate partial rotation of gears 134, which are so moved by the action of connecting rods 141, themselves actuated by the rotation of cranks 144 on shaft 145.

Necessarily, the operation of the printer, although substantially continuous, is intermittent because of the timed movements of gates 115 and 127. Because of this condition, the extrusion of the continuous strip of margarine from nozzle 31 is also intermittent. The screw conveyors 23, which are rotated continuously, however, cannot then continuously force margarine through nozzle 31; and, accordingly, while steadily forcing the margarine into nozzle 31 and against one or both of gates 115 and 127, they gradually screw themselves out of the compressed mass of margarine and force the gear casing 68, to which they are firmly attached, to slide backward along rails 82. The net effect may be likened to that arising when a bolt loosens itself from a nut held in a fixed position. When either of the two gates 115 and 127 is moved forward by the movement of either carriage 104 or 105, respectively, the screw conveyors also move forward and extrude another portion of the continuous strip of margarine through nozzle 31.

The forward movement of these screw conveyors is effected by means of piston 77, which is attached to gear casing 68 through piston rod 75 and which is pneumatically actuated through air valve 150a by means of cam 150. During this forward movement the screw conveyors act much like a ram and, in fact, force the margarine through nozzle 31 under considerable pressure. The action of the screw conveyors packs the particles of solidified margarine together whereby the margarine is delivered through nozzle 31 in a solid stream that is devoid of air pockets. This forward movement is extremely rapid as compared to the slow backward movement when conveyors 23 screw themselves out of the compressed margarine. Cam 150 is so positioned with respect to cams 151 and 152 and its operation so synchronized with the operation of cams 151 and 152 that piston 77 is actuated only when either gate 115 or gate 127 is being moved forward, i. e., when gate 115 is moved into the position shown in Fig. 13a from that shown in Fig. 13f and when gate 127 is moved into the position shown in Fig. 13d from that shown in Fig. 13c.

In this connection it will be noted that the shape of cam 150 is different from that of cams 151 and 152, which are similar, since cam 150 must accomplish forward movement of screw conveyors 23 twice for each complete cycle of movement of the reciprocating carriages and since valve 150a is desirably single-acting and valves 151a and 152a are desirably double-acting. The respective shapes of these cams are clearly shown in Figs. 1 and 14. As already described, these cams are all desirably fastened on the same shaft together with cranks 144 so that the operation of the screw conveyors, that of the reciprocating carriages, and that of the cutting gates can be fully synchronized. Also, shaft 145 carrying these cams and cranks may desirably be driven from the wrapper as by means of belt 148 and pulley 149 whereby the molding, printing, and wrapping operations can all be synchronized.

In this manner, the screw conveyors 23 can be operated continuously and smoothly; and the operating difficulties otherwise involved, if the rotation of the screw conveyors is stopped intermittently in accordance with the intermittent movement of the continuous strip of margarine, can be avoided. With this form of embodiment of my invention, I can produce upwards of 60 or more uniform prints per minute.

In this connection it is to be noted that the rate at which the screw conveyors force margarine into nozzle 31 is desirably somewhat greater than the rate at which the resulting continuous strip of margarine is extruded from nozzle 31 and then cut into prints so that the delivery of a full amount of margarine to nozzle 31 and the production of uniformly shaped cuts are assured. This excess margarine thus present in housing 22 does not, however, interfere with the operation of the molder and is continuously squeezed backward along the internal surface of the housing and between the two screw conveyors.

Accurate adjustment of cutting blades 115 and 127 so that the difference between the actual weight and the desired weight of each print is reduced to the very minimum is also permitted by my improved apparatus. This object is accomplished by varying the length of the slotted portion 140 in connecting rods 141 by adjusting the position of screws 142 whereby the distance that the reciprocating carriages 104 and 105 are moved with each revolution of shaft 145 is closely and carefully controlled. Although, in the form of my invention as described above, the distance that the reciprocating carriages are moved represents the width of the desired margarine print, it may also represent the length or even the thickness thereof.

A modified form of embodiment of my improved printer, which is provided with only one reciprocating carriage, is shown in Figs. 15 to 17. Since many elements of both forms of my improved apparatus are the same, the same reference numbers will be used when it is convenient to do so.

This modification includes the rectangular cross sectional tube 98 provided with the extended side walls 101 and also provided with the extended top wall 171, which is desirably jacketed as at 172. Attached to the outer end of this extended top wall is the stationary housing 173, which is similar in construction to the housing 104a in the reciprocating carriage 104 used with the form of my invention previously described and which contains the upper cutting gate or blade 174.

Reciprocating carriage 175 containing cutting gate or blade 176 is positioned in the outlet end of tube 98 and is adapted to move in an intermittent reciprocating manner along the bottom wall thereof. The construction of this carriage is identical to that of reciprocating carriage 105a shown in Fig. 4 except that, in Fig. 15, cylinder 118 is provided with outlet 123a below the raised position of piston 129 and with the vent 177. In addition, the flanges 132 extending from the upper portion of housing 175a are attached to the racks 178, which engage gears 134 respectively carried on the ends of shaft 179 journaled in brackets 180 attached to or formed integrally with the bottom wall of tube 98. Attached to one end of shaft 179 is the crank 138, the outer portion of which is provided with pin 139 adapted to slide in the slotted portion 140 of the connecting rod 141.

Connecting rod 141 is actuated by the rotation of shaft 145, to which are attached cams 181, 182, and 183 respectively operating compressed air valves 181a, 182a, and 183a. These valves may all be single-acting, and their construction is similar to that of valve 150a shown in detail in Fig. 10. As in the form of my invention previously described, valve 181a is connected by flexible tubing (not shown) to cylinder 78 which actuates the screw conveyors 23 in a forward direction.

The outlet from valve 182a is connected by suitable flexible tubing (not shown) to inlet 110 on cylinder 106 which operates the gate 174; and the outlet from valve 183a is similarly connected to inlet 122 on cylinder 118, which operates the gate 176. A flexible tubing connection 184 is provided between outlet 123a on cylinder 118 and inlet 111 on cylinder 106.

The relative positions of cutting gates 174 and 176 during the several stages of the cutting cycle of this modified printer are clearly shown in Fig. 18. Again, during this entire cycle, one of these gates is always positioned across the passage defined by tube 98, its wall extensions, and the reciprocating carriage 175.

In the stage shown in Fig. 18a, the lower cutting gate 176 has just been moved backward a distance equal to the width of the print to be made. In the stage shown in Fig. 18b, gate 176 has been moved into the cutting position to form print P¹; and in that shown in Fig. 18c, the upper gate 174 has just been moved out of the cutting position leaving print P⁰ to be wrapped and packaged. The movement of these two gates is also so synchronized that gate 176 moves entirely into the cutting position before the disengagement of gate 174 begins. This synchronization is desirably accomplished by the actuation of piston 129 by the introduction of compressed air through inlet 122 into cylinder 118 immediately followed by the actuation of piston 117 by diversion through tubing 184 into cylinder 106 of a portion of the compressed air introduced continuously into cylinder 118.

In the stage shown in Fig. 18d, lower gate 176 has been moved forward a distance equal to the width of print P¹, which has displaced print P⁰ towards the wrapper and itself now occupies the space formerly taken up by print P⁰; and in that shown in Fig. 18e, upper gate 174 has been moved into the cutting position and has thereby displaced lower gate 176. Again, the movements of these two gates are so synchronized that gate 176 is moved out of the cutting position only as gate 174 is moved into the same cutting position. Desirably, gate 176 is displaced by gate 174 under the actuation of piston 117 by compressed air introduced through inlet 110.

Forward movement of screw conveyors 23 is again effected only during the forward movement of gate 176 but is accomplished only once for each complete cycle of movement of reciprocating carriage 175. Cam 181 is also so positioned on shaft 145 with respect to cams 182 and 183 and the operations of all three cams are so synchronized that piston 77 is actuated only when gate 176 is being moved forward into the position shown in Fig. 18d from that shown in Fig. 18c. Figs. 19a to 19e show the relative positions of cams 182 and 183 corresponding, respectively, to the relative positions of the cutting gates shown in Figs. 18a to 18e. The shape of the three cams, which are similar, is clearly shown in Fig. 19.

Upper gate 174 is desirably made somewhat thinner than lower gate 176 as shown in Fig. 18 so that water or some other suitable fluid may be injected against the outer surface of the gates in order to permit easier separation of the margarine print therefrom. Preferably, the two gates are so positioned that their inner surfaces are flush.

With this modified form of printer, accurate printing can also be obtained; and the operations of the molder, the printer, and the wrapper (not shown) can be completely synchronized. It will be obvious, however, that, at the same speed of operation, this modified printer will produce only half as many prints as the form first described.

It will be apparent that the stationary housing 173 may be positioned on the bottom wall of tube 98 and the reciprocating carriage 175 on the top wall or that both may be positioned on the side walls. Similarly, in the form of printer shown in Fig. 1, both reciprocating carriages may be positioned on the side walls if it is desirable or necessary to do so. Furthermore, in either form, the two cutting gates are desirably, although not necessarily, located in opposite walls of tube 98.

It will also be apparent that the application of my invention is not necessarily limited to the molding and printing of plastic oleaginous materials but that my invention may also be applied to the molding and printing of other semisolid to solid plastic comestibles such as yeast, ice cream, and the like.

Although I have described preferred forms of embodiment of my invention, I am not necessarily limited thereto; and only the limitations appearing in the claims appended hereafter should be applied.

I claim:

1. The method of molding a plastic semisolid to solid material, which comprises introducing a mass of said material into a space having a point of discharge, forcing the mass of material under pressure through the space to said point of discharge and molding said material under pressure into a ribbon having a predetermined cross section, discharging said ribbon from said space at said point of discharge, intermittently interrupting the discharge of the ribbon from the space, continuously applying pressure to the material undergoing molding, applying additional pressure to the material during the discharge of the material from said point of discharge, and synchronizing the forcing of the material through the space with the discharge of molded material therefrom.

2. The method of molding and printing a plastic semisolid to solid material, which comprises introducing a mass of said material into a space having a point of discharge, forcing the mass of material under pressure through the space to said point of discharge and molding said material under pressure into a ribbon having a predetermined cross section, intermittently discharging and advancing the ribbon from said space at said point of discharge, cutting the intermittently advanced ribbon into prints of a predetermined size, continuously applying pressure to the material undergoing molding, applying additional pressure to the material during the discharge of the material from said point of discharge, synchronizing the forcing of the material through the space with the advancement of the ribbon, and synchronizing the cutting of the ribbon with the interruption in the advancement thereof.

GORDON C. SCHAUB.

No references cited.